United States Patent [19]

Zannis

[11] Patent Number: 5,028,856

[45] Date of Patent: Jul. 2, 1991

[54] CONTROLLED LINEAR MOTOR

[75] Inventor: James Zannis, Wotton-Under-Edge, United Kingdom

[73] Assignee: Renishaw plc, Gloucestershire, United Kingdom

[21] Appl. No.: 460,879

[22] PCT Filed: Jun. 22, 1989

[86] PCT No.: PCT/GB89/00699

§ 371 Date: Feb. 7, 1990

§ 102(e) Date: Feb. 7, 1990

[87] PCT Pub. No.: WO89/12903

PCT Pub. Date: Dec. 28, 1989

[30] Foreign Application Priority Data

Jun. 22, 1988 [GB] United Kingdom ................. 8814777

[51] Int. Cl.[5] .............................................. G05B 11/00

[52] U.S. Cl. .................................... 318/687; 346/141; 346/140 R; 318/135; 335/258; 335/229

[58] Field of Search ................ 318/687, 135; 346/140, 346/141; 335/258, 229

[56] References Cited

U.S. PATENT DOCUMENTS

| | | | |
|---|---|---|---|
| 3,824,603 | 7/1974 | Bates et al. | 346/141 |
| 4,334,180 | 1/1982 | Bramm et al. | 318/687 |
| 4,370,604 | 1/1983 | Griffin | 318/687 |
| 4,375,609 | 3/1983 | Wolf | 388/814 |
| 4,423,361 | 12/1983 | Stenudd et al. | 318/135 |
| 4,463,332 | 7/1984 | Everett | 335/258 |
| 4,544,129 | 10/1985 | Ichiryu et al. | 137/625.65 |
| 4,648,580 | 3/1987 | Kuwano et al. | 251/129.04 |
| 4,660,055 | 4/1987 | Enda | 318/687 |
| 4,847,581 | 7/1989 | Mohler | 335/229 |

FOREIGN PATENT DOCUMENTS

| | | |
|---|---|---|
| 2521532 | 12/1976 | Fed. Rep. of Germany . |
| 3116316 | 11/1982 | Fed. Rep. of Germany . |

OTHER PUBLICATIONS

"An Era of Change in Fluid Power", Carill Sharpe Design Engineering, Apr. 1988, pp. 45-54.

An Era of Change in Fluid Power—Show Preview Design Engineering, 1988—pp. 45-56.

Soft Shift Solenoids—Electromechanical Products, LEDEX—2 pages.

Solenoid Fundamentals—Engineering Data Sheet No. LX1—4 pages, Apr. 1, 1972, N.S.F.

Technical Notes on DC Solenoids—7 pages.

*Primary Examiner*—William M. Shoop, Jr.
*Assistant Examiner*—Saul M. Bergmann
*Attorney, Agent, or Firm*—Oliff & Berridge

[57] ABSTRACT

The linear drive motor is based around a proportional solenoid L1, to which is connected a velocity transducer F1. The velocity output of the transducer F1 is compared to a reference voltage V1 by an error amplifier/driver A1, which in turn drives the solenoid L1. This gives velocity control to the linear motor, without the usual disadvantageous rotary to linear conversion mechanisms. The linear motor therefore has a higher bandwidth, and is free from mechanical vibrations and resonances, and from backlash.

8 Claims, 2 Drawing Sheets

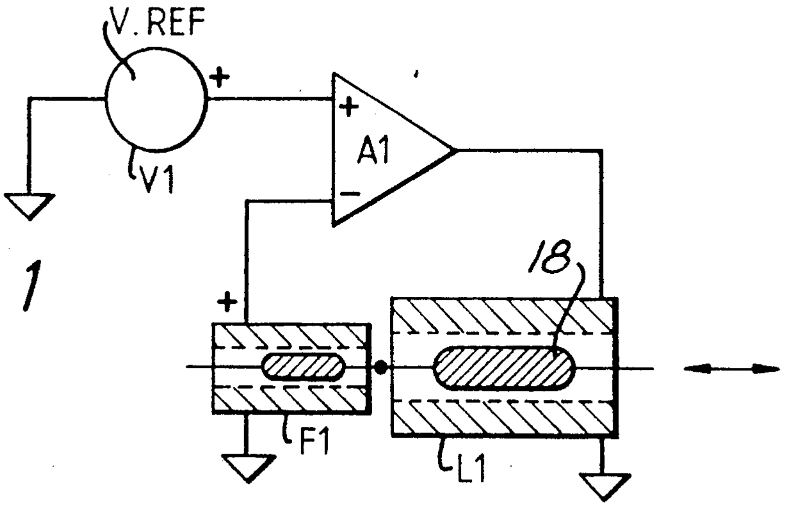
FIG. 1
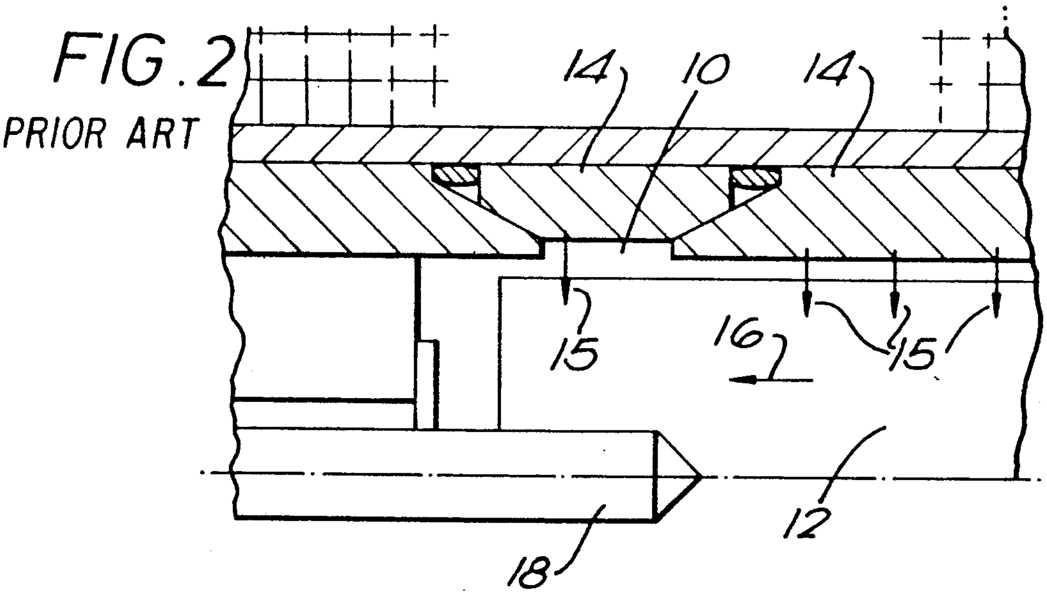
FIG. 2
PRIOR ART
FIG. 3
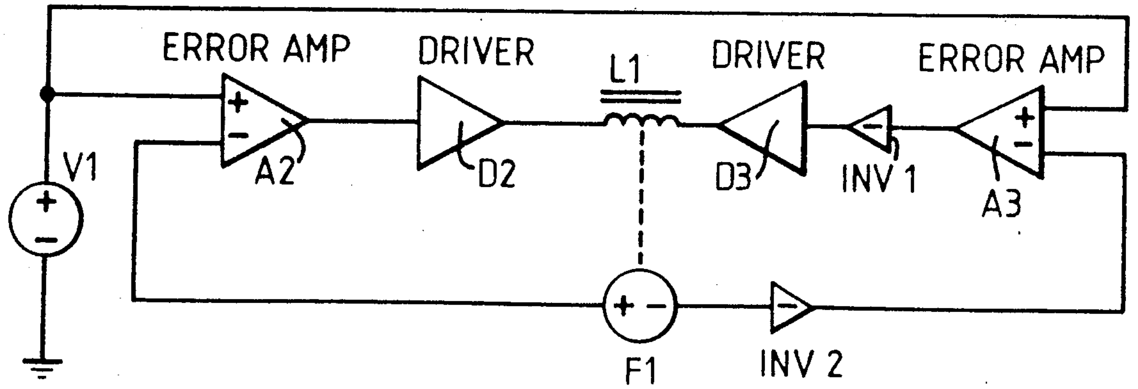

CONTROLLED LINEAR MOTOR

This invention relates to linear drive motors, and more particularly to the control of such motors.

Conventional linear drive motors employ a standard motor/gearbox with a rotary to linear conversion device, typically lead screws or lever mechanisms. Problems incurred with this technique are backlash, mechanical vibration, unwanted mechanical resonances, and low bandwidth. It is known to control such motors by providing a velocity feedback from a tachometer, but this introduces unwanted AC components, e.g. caused by the commutating action of the tachometer. When the AC components are filtered out, the system bandwidth is reduced further. For precision mechanical drive systems, some or all of these characteristics are undesirable.

The present invention provides a linear drive motor, comprising:

a proportional solenoid, having an electrical input, and a mechanical output member which is driven with a linear motion in proportion to the electrical input; a velocity transducer connected to the mechanical output member of the solenoid and producing an electrical output signal dependent on the velocity thereof; and a feedback circuit which receives the electrical output signal of the velocity transducer and controls the electrical input to the solenoid in accordance therewith, thereby controlling the velocity of the mechanical output member.

Examples of the present invention will be described with reference to the accompanying drawings, in which:

FIG. 1 is a schematic diagram of the basic elements of a first embodiment of a controlled linear motor;

FIG. 2 is a schematic section through part of a proportional solenoid; and

FIGS. 3, 4 and 5 are schematic circuit diagrams of three further embodiments of controlled linear motor.

Figure 4:
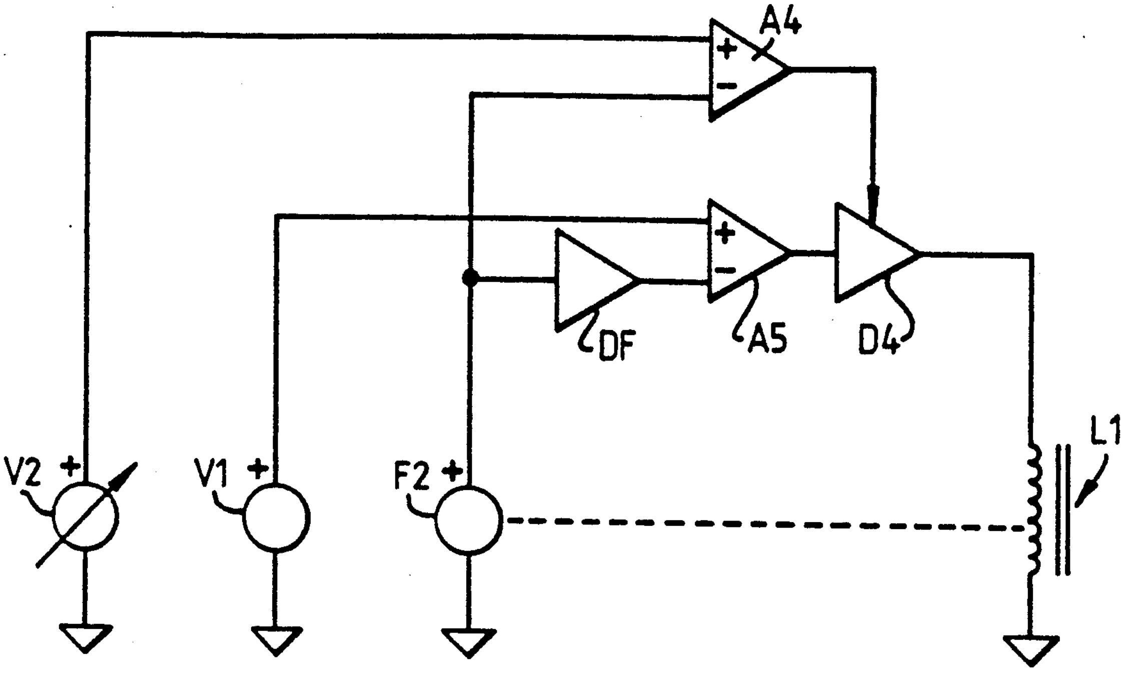

In FIG. 1, L1 is a proportional solenoid such as used in hydraulic systems. Suitable devices are available from Ledex Electromechanical Products (Ledex Inc, 801 Scholz Drive, PO Box 427, Vandalia, Ohio, USA) or Elektroteile GmbH (Germany). The solenoid L1 produces a linear output motion of an output member 18, which can be used as desired. It is also connected to drive a velocity transducer F1, which produces a DC output proportional to the velocity. Appropriate devices could be piezo ceramic elements (flexible or rigid), or an electromagnetic linear velocity transducer (LVT) such as available from Schaevitz Corp., USA.

A proportional solenoid, as used for the solenoid L1, is distinguishable from a conventional solenoid as follows. A conventional solenoid basically consists of a coil, to carry current and establish a magnetic flux; an iron shell, to contain and direct the flux in a manner commensurate with the desired operation of the solenoid; and a movable armature, to act as the working element. The magnetic flux lines are transmitted through a path consisting of air and iron; the iron, of course being the more efficient of the two, and the air gap being necessary for physical movement. The force of attraction between the stationary shell and the movable armature is inversely proportional to the square of the distance between them, across the air gap. This results in the familiar snap action as the armature completes its stroke. It is this type of magnetic action that makes a constant velocity difficult to achieve with servo electronics.

The proprietary proportional solenoids mentioned above look very much like conventional solenoids; both have coils, armatures, housings; major differences are in the pole pieces and bearing systems. As previously noted, the air gap diminishes in a standard solenoid. However, as shown in FIG. 2, in a proportional solenoid the working air gap 10, between the movable armature 12 and the pole piece 14, is perpendicular to solenoid motion (indicated by arrow 16). The lines of magnetic flux passing across the working air gap 10 are indicated by arrows 15. Thus the air gap remains constant through the solenoid's linear stroke. In this configuration, the positioning of the pole pieces, and consequently the magnetics, can be controlled by design to achieve the desired force versus stroke characteristics. The resultant force curve may be essentially horizontal. This is described in an article "An Era of Change in Fluid Power" by Carill Sharpe, Design Engineering, April 1988, pages 45–46.

The output of the transducer F1 in FIG. 1 is compared in an error amplifier/driver A1 with a reference voltage from a source V1, which defines the demanded velocity. The amplifier/driver A1 in turn drives the solenoid L1 so as to tend to equalise the actual velocity to the demanded velocity, providing closed-loop control of the linear velocity. Of course, if it is desired to have a variable velocity, the error amplifier A1 may receive a variable control voltage instead of a fixed reference voltage. The drive output of the amplifier/-driver A1 can be configured as a voltage drive or a current drive.

For higher efficiency, it is possible to use a bridge arrangement as shown in FIG. 3. The solenoid L1 and velocity transducer F1 are arranged mechanically in the same way as shown in FIG. 1. Electrically, however, the solenoid L1 is connected in series between the respective outputs of two drivers D2, D3. One side of the transducer F1 is electrically connected to the input of an error amplifier A2, while the other side of F1 is connected to an error amplifier A3 via an inverter Inv2. These error amplifiers compare the velocity signals with the voltage reference V1 which defines the demanded velocity. The driver D2 is driven directly by the error output of the error amplifier A2, while the driver D3 is driven from the error output of the amplifier A3 via an inverter Inv1. The inverter Inv1 provides a 180° out of phase signal to drive the opposing side of the solenoid. The drivers D2, D3 could be voltage drives or current drives, as previously.

In place of the linear types of velocity tranducer suggested above, it is possible to use position transducers giving an output which is representative of the instantaneous position of the output member 18. The displacement information obtained form this transducer is then fed to a differentiation circuit to obtain the velocity, which is then used in the same manner as shown in FIG. 1 or FIG. 3. Suitable position transducers include electromagnetic devices such as linear variable differential transformers (LVDT's); diffraction grating type scale and read head systems, such as available from Renishaw Research Limited, Old Town, Wotton-Under-Edge, Gloucestershire, United Kingdom or from Dr. J. Heidenhain GmbH, Postfach 120, D-8225 Traunreut, Federal Republic of Germany. Alternatively, any other displacement transducer may be used, such as potentiometric, photovoltaic, photoconductive, reluctive, synchro, strain gauge and capacitive displacement transducers.

It is already known to control the output position of a proportional solenoid, using feedback from a position transducer. Such position control is also easily realised in conjunction with velocity control, when the velocity information is obtained by differentiation of the output of a position transducer as described above. FIG. 4 shows how this can be achieved by nesting a velocity control circuit as shown in FIG. 1 within a position feedback loop.

In FIG. 4, the proportional solenoid L1 is mechanically connected to a displacement transducer F2, which can be a diffraction grating type scale and read head having an output indicating position or displacement. This is differentiated by a differentiation circuit DF to give a velocity signal, which is then compared, by an error amplifier A5, with the voltage reference V1 defining the demanded velocity. The error output from amplifier A5 is used by a driver D4 to provide the drive for the solenoid L1. The circuit as so far described, which equates to that of FIG. 1, is nested within a position control servo loop which has an error amplifier A4 for comparing a voltage source V2 with the position output of the transducer F2. The voltage source V2 is variable, defining the demanded position. The output of the error amplifier A4 has overall control of the driver D4 which drives the solenoid L1. Thus, when the error amplifier A4 detects that the position of the output member of the solenoid L1 is not at the demanded position, it activates the driver D4 to supply current (or voltage) to move the solenoid. The driver D4 does so at a rate controlled by the error amplifier A5 in the velocity feedback loop, so that the solenoid moves to its new position at a constant velocity set by the reference voltage V1.

The transducer F2 in FIG. 4 can be replaced by a position transducer having an output circuit such as shown in European patent application number 0274841. This circuit has separate position and velocity outputs, which (after suitable interfacing) can be taken directly to the error amplifiers A4,A5, without the need for a separate differentiating circuit DF2.

Figure 5:
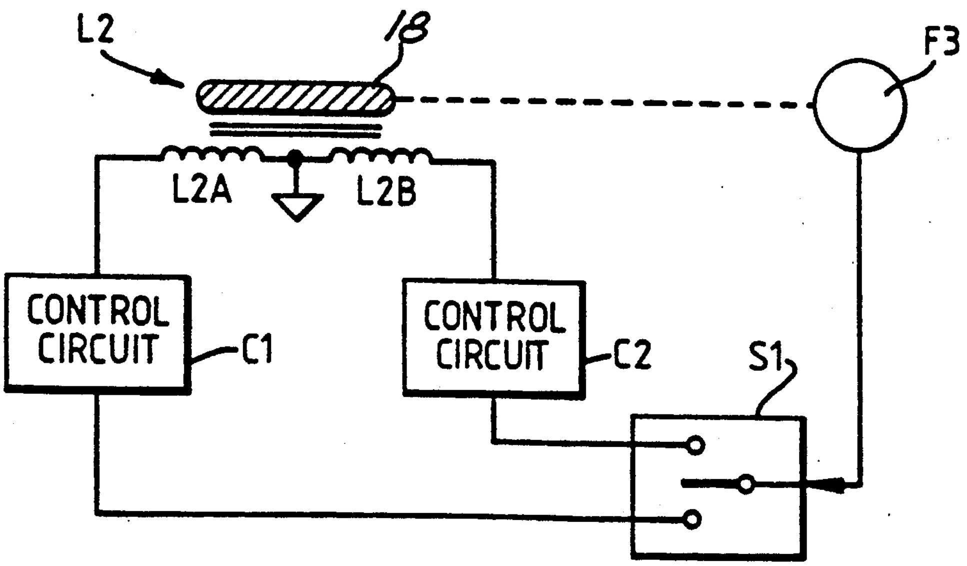

In all the circuits described thus far, the solenoid L1 has been a unidirectionally acting solenoid, in which current from the driver causes movement in one direction only. This is the normal arrangement of a solenoid, and usually return movement would be provided by (for example) a spring acting on the output member 18, which would commonly form a part of the mechanical device being driven by the linear drive motor. In some cases, however, bi-directional action may be desired. This can be achieved as shown in FIG. 5, in which a proportional solenoid L2 comprises two coils L2A,L2B arranged back to back. Each coil has a respective control circuit C1,C2 consisting of an error amplifier/driver and voltage reference, as described in FIG. 1 or FIG. 4 (or FIG. 3, with appropriate modifications to the coil terminals). The voltage references have opposite polarities to provide bi-directional operation. The output member 18 of the solenoid L2 is connected to a velocity transducer F3. The velocity output of the velocity transducer is taken to either the control circuit C1 or the control circuit C2, as selected by a selector switch S1 (which can be a semiconductor device controlled by an external circuit). This controls the direction of operation required. The starting position for one direction of movement is the end position for the other direction of movement. If velocity control is only required for one direction of movement, of course only one of the control circuits C1,C2 is required, and the selector switch S1 can be omitted.

The bi-directional proportional solenoid L2 just described is effectively equivalent to two unidirectional proportional solenoids connected back to back. Two proprietary unidirectional proportional solenoids, so connected, can therefore be used instead if more readily available.

The advantages of the systems described are readily apparent. Due to the absence of gears, pullers, belts and drives, the inertia of the system is low and the stiffness is high, giving a high bandwidth. The DC velocity feedback precludes the need of extra filtering, and a corresponding drop in the bandwidth. The vibration is inherently low, since there are no rotary components. Likewise any backlash can be designed to a very low level because the transducer can be in intimate contact with the solenoid.

The linear motors described have useful applications in motion control, such as precision tables and stages, robotics and micromanipulators. Using the presently available proprietary parts mentioned above, it can have a stroke of about 10 mm, but of course this stroke can be increased by the use of different components.

I claim:

1. A linear drive motor, comprising:

a proportional solenoid, having an electrical input, and a mechanical output member which is driven with a linear motion in proportion to a quantity of the electrical input;

a velocity transducer connected to the mechanical output member of the solenoid and producing an electrical output signal dependent on the velocity thereof; and a feedback circuit which receives the electrical output signal of the velocity transducer and controls the quantity of the electrical input to the solenoid in accordance therewith, thereby controlling the velocity of the mechanical output member.

2. A linear drive motor according to claim 1, wherein the proportional solenoid has a substantially constant working air gap.

3. A linear drive motor according to claim 1 wherein the velocity transducer comprises a piezo ceramic element or an electromagnetic linear velocity transducer.

4. A linear drive motor according to claim 1, wherein the velocity transducer comprises a position transducer having a velocity output for a position of the mechanical output member.

5. A linear drive motor according to claim 4 wherein the position transducer includes a differentiation circuit for deriving the velocity output from the position of said mechanical output member of the solenoid.

6. A linear drive motor according to claim 4 including a further feedback circuit, which receives a position output from the position transducer, and controls the quantity of the electrical input to the solenoid in accordance therewith, thereby controlling the position of the mechanical output member.

7. A linear drive motor according to claim 1, wherein said solenoid comprises two solenoid coils arranged back-to-back to drive the mechanical output member in respective opposite directions.

8. A linear drive motor according to claim 1, in which the solenoid and the transducer are arranged in a bridge circuit with two said feedback circuits.

* * * * *